W. M. DECKER.
NURSING BOTTLE.
APPLICATION FILED MAY 4, 1909.
985,328.
Patented Feb. 28, 1911.
2 SHEETS—SHEET 2.
Fig. 4.
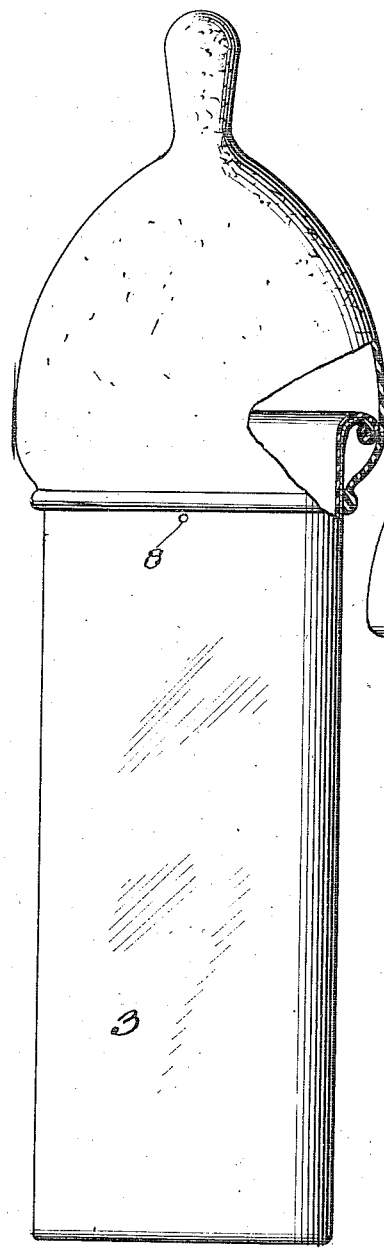
Fig. 3.
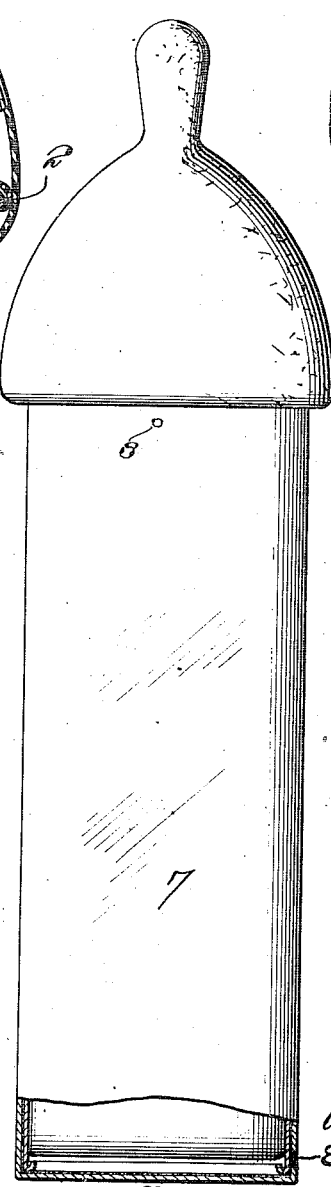
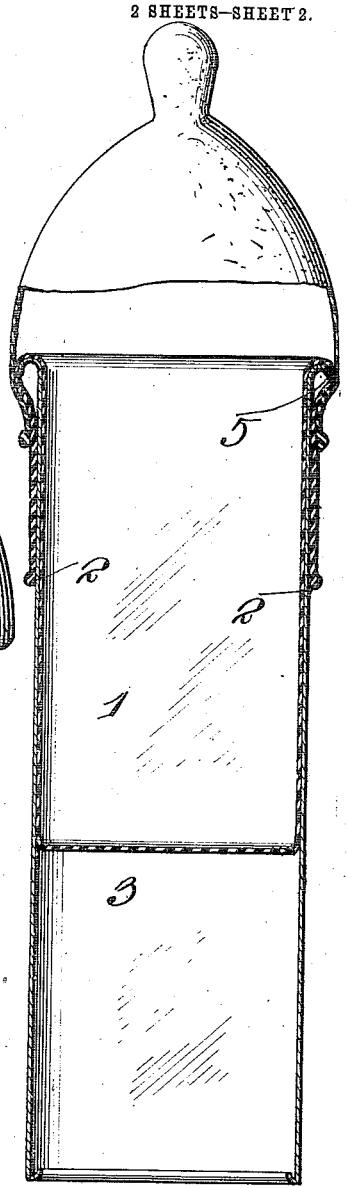
Fig. 6.
Witnesses
Inventor
Wm. More Decker
By
Attorney

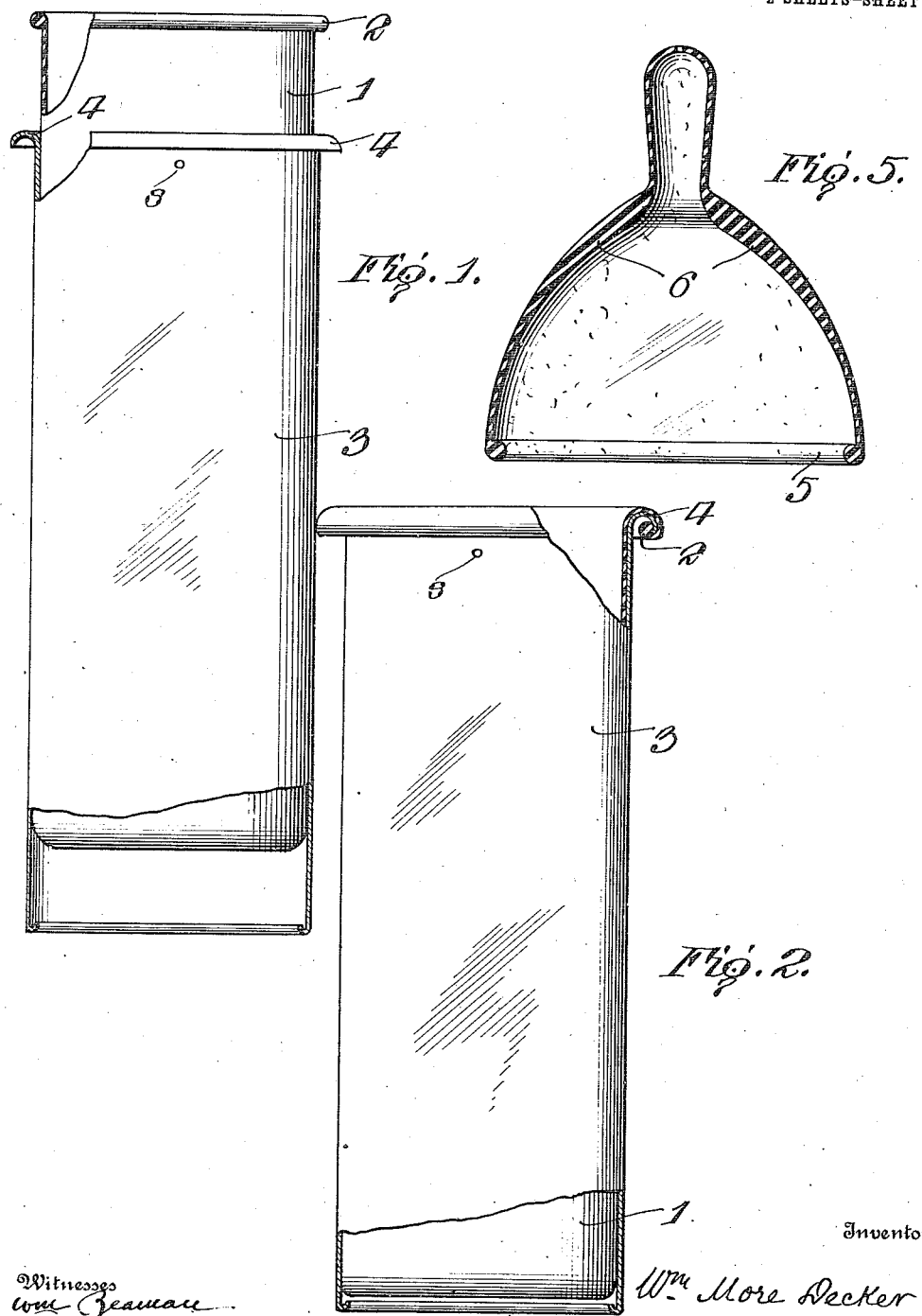

UNITED STATES PATENT OFFICE.

WILLIAM MORE DECKER, OF BUFFALO, NEW YORK.

NURSING-BOTTLE.

985,328.  Specification of Letters Patent. Patented Feb. 28, 1911.

Application filed May 4, 1909. Serial No. 493,881.

*To all whom it may concern:*

Be it known that I, WILLIAM MORE DECKER, a citizen of the United States, residing at Buffalo, in the county of Erie and State of New York, have invented certain new and useful Improvements in Nursing-Bottles; and I do hereby declare the following to be a full, clear, and exact description of the invention, such as will enable others skilled in the art to which it appertains to make and use the same.

My invention relates to certain new and useful improvements in nursing bottles of that class in which the food receptacle or cell is closed at the top by a combined flexible breast and nipple such as shown and described in Letters Patent granted to me on the 19th day of June, 1894, Serial No. 521,773. In the Letters Patent referred to, the food receptacle or cell is composed of glass, and the combined breast and nipple is held in position by a circumferential rib or bead surrounding the upper open end of the cell.

My present invention has for its object to substitute for the glass receptacle or cell, a flexible and collapsible cell which cannot be broken, and which will prevent the infant from nursing air.

My invention also has for its objects to sustain the food receptacle or cell by a non-flexible jacket in order that it may be thoroughly protected, and supported in upright position when not in use, and which will also serve the purpose of keeping the receptacle and its contents at a proper degree of temperature.

My invention has also for its object to enable the nursing bottle to be thoroughly cleansed by turning both the receptacle and breast and nipple inside out and washing the same.

With these ends in view, my invention consists in the details of construction and arrangement hereinafter and in detail explained.

In order that those skilled in the art to which my invention appertains may know how to make my improved nursing bottle or device, and to fully appreciate its advantages, I will proceed to describe the same, referring by numerals to the accompanying drawing, in which:

Figure 1 is a side elevation partly in section, showing the food receptacle located within the outer supporting body, and before the former, at its upper end, has been secured in position within the same. Fig. 2 is a similar view showing the upper open end of the food receptacle secured in position, with the upper end of the protecting and supporting jacket. Fig. 3 is a view similar to Fig. 2, and showing the combined breast and nipple secured in position upon the upper extremities of the food receptacle and its jacket or support. Fig. 4 is a view similar to Fig. 3 and showing the interior flexible receptacle within its exterior jacket and support, and the latter surrounded by an auxiliary heat-retaining jacket. Fig. 5 is a central vertical section of the combined breast and nipple and showing the construction adapted to prevent collapse at the point of juncture between the breast and the nipple; and Fig. 6 is a central vertical section of the collapsible food receptacle shortened and secured within the protecting and supporting jacket and with the combined breast and nipple in position.

Similar reference numerals indicate like parts in the several figures of the drawing.

1 represents the food receptacle composed of rubber, or other suitable liquid-proof and collapsible material, closed at its bottom and formed at its upper open end with a circumferential rib 2, as clearly shown in Fig. 1.

3 is a jacket of non-flexible material adapted to support and protect the collapsible food receptacle, and which may be composed of aluminum, tin, glass, hard rubber or other suitable material adapted to sustain the food receptacle and also to act to retain the heat of the food within the receptacle. This jacket 3 is open at its bottom, and at its upper open extremity it is formed with a curved flange 4, into which the circumferential rib 2 of the receptacle is rolled to secure air and liquid-tight connection between the two.

9 is a combined breast and nipple of rubber formed with a rib or bead 5 at its lower extremity and located underneath the flange 4 of the jacket 3, and in contact with the circumferential rib 2 of the food receptacle. This breast and nipple may be such as shown and described in the Letters Patent hereinbefore referred to, but as my present invention involves the employment of a collapsible food receptacle, I prefer to use a breast and nipple such as shown in Fig. 5, which is composed of comparatively light and thin rubber or other similar flexible material reinforced as shown at 6, at the juncture between the breast and nipple to avoid the possibility of the collapse at the base of the nipple; this construction of the breast and nipple when used in connection with the collapsible food receptacle permits the use of a comparatively light and thin breast and nipple and involves economy of material which is a matter of importance.

While the jacket or support 3 serves to prevent the radiation of the heat of the food within the receptacle 1, I prefer to use as an auxiliary means for this purpose a secondary jacket or envelop 7, composed of card-board or any other suitable material which may be lined with felt, asbestos, or any other suitable non-conductor of heat. This auxiliary jacket is open at the top and closed at its bottom, and is provided at such locality with an air passage 8 in order that the collapsibility of the food receptacle may not be retarded. This jacket or envelop is simply telescoped upon the jacket or receptacle support 3, and in order to facilitate such action I prefer to turn the lower extremity of the jacket or support inwardly as clearly shown.

When the receptacle has had food placed within the same, and the breast and nipple has been secured in position upon the jacket or support, the food may be heated to a desired temperature by immersing the device in heated water, and in order that any air existing between the receptacle and its jacket or support may be expelled, the jacket or support is formed near its upper extremity with one of more radial vents 8'.

I desire to call particular attention to the fact that my improved food receptacle is collapsible throughout its entire extent, and consequently an infant nursing from said receptacle will not nurse any air, that the receptacle unlike other nursing devices, cannot be broken, and owing to its flexibility it can be turned inside out and thoroughly cleansed, as also is the case with the combined breast and nipple, and thus absolutely sanitary conditions can at all times be maintained.

While I have shown and prefer to employ the secondary or auxiliary heat-retaining device, I do not wish to be confined to its use, as the supporting jacket may under ordinary circumstances retain the temperature of the food in the receptacle to a sufficient extent and for a sufficient period of time.

It will also be understood that as a result of the construction and arrangement described, the flexible food receptacle is not only securely attached to its protecting and supporting jacket, but that the flexible breast and nipple is so secured in position that the flexible body of the receptacle contacts with the flexible body of the breast and nipple, and thus an air and liquid-tight joint is secured between the two, and an airtight joint between the breast and the supporting jacket is also secured.

It will be readily comprehended that as the contents of the receptacle are exhausted, the receptacle will correspondingly collapse while at the same time the receptacle may be readily handled by its supporting jacket, and that when it is desired to recharge the receptacle it may be readily removed from its supporting jacket and thoroughly cleansed by first removing the breast and nipple, and then unrolling the circumferential bead of the receptacle from the curved flange of the supporting jacket.

Should it be desired to reduce the area of the food receptacle, the upper beaded end may be drawn over the flanged upper end of the protecting and supporting jacket and the combined breast and nipple secured in position as shown in Fig. 6, in which case, as also in the case where the beaded extremity is located within the flanged upper end of the protecting and supporting jacket, the contact of the open extremity of the breast and nipple with the surface of the flexible food receptacle results in producing a liquid and air-tight joint. This effect is more effectively secured by reason of the fact that the rib or bead at the extremity of the breast is on the inner surface preferably flat in order that a greater contact surface with the receptacle is effected and hence a more perfect liquid and air-tight joint is made.

Recurring to the combined breast and nipple which while especially adapted for use in connection with the food receptacle and its support as herein described may be advantageously used in connection with any other receptacle to which it may be applied, but in either case it is more desirable than others at present in use owing to the fact that by reason of the reinforced zone at the juncture between the breast and nipple, the remainder of the device may be made comparatively light, thus effecting economy of rubber as hereinbefore stated, and the presence of this stiffened or reinforced portion at the base of the nipple constitutes a shield and prevents an infant from taking more than the nipple in the mouth and also prevents the nipple from collapsing at the base thereof.

While my improved nursing bottle as a whole embodies the collapsible food containing vessel supported and protected by the non-flexible jacket, and a composite breast and nipple of the construction shown, I make no claim herein to said features of construction as they constitute the subjects matter of divisional applications filed by me August 11, 1909, bearing Serial Numbers 512,445 and 512,444 respectively.

Having described the construction, operation and advantages of my improved nursing device, what I claim as new and desire to secure by Letters Patent is:

1. In a nursing device, the combination with a flexible collapsible food receptacle having an open end, of a non-flexible jacket adapted to contain a predetermined portion of said receptacle, and means for adjusting the portions of said receptacle contained inside and outside the jacket and securing same at the open end of the jacket, substantially as described.

2. In a nursing device, the combination with a rigid jacket having an open end, of a flexible collapsible food receptacle adapted to be carried therein and secured at the open end of the jacket, and a combined breast and nipple embracing the end of the jacket and food receptacle and forming a liquid and air-tight closure between the parts, substantially as described.

3. In a nursing device, the combination with a collapsible food-containing vessel, of a non-flexible supporting jacket adapted to contain same, a secondary jacket surrounding said supporting jacket, and a nursing device embracing the open ends of said food containing vessel, supporting jacket and secondary jacket and forming therewith a liquid and air-tight closure, substantially as described.

4. In a nursing device such as described, a flexible and collapsible food receptacle located within a non-flexible rigid supporting and protecting jacket, and with its open extremity in contact with the exterior surface of the supporting and protecting jacket; and a combined breast and nipple in liquid and air-tight contact with the food receptacle and confining the same in close contact with the supporting and protecting jacket, substantially as hereinbefore set forth.

5. In a nursing device, the combination with a rigid jacket having an open end, of a flexibly collapsible food receptacle adapted to be carried therein and secured at the open end of the jacket, and a flexible nursing device embracing the open ends of said food receptacle and jacket and in contact with said food receptacle to form an air and liquid-tight joint between same, substantially as described.

In testimony whereof, I have signed my name to this specification in the presence of two subscribing witnesses.

WM. MORE DECKER.

Witnesses:
W. F. STURM,
RUTH E. ALLEN.